United States Patent [19]
van Ginhoven

[11] 4,023,365
[45] May 17, 1977

[54] COMBUSTION ENGINE WITH PRESSURE FILLING BY THE THRUST SYSTEM
[75] Inventor: Johannes A. J. van Ginhoven, Ankeveen, Netherlands
[73] Assignee: Stork-Werkspoor Diesel B.V., Amsterdam, Netherlands
[22] Filed: Oct. 4, 1974
[21] Appl. No.: 512,020
[30] Foreign Application Priority Data
Oct. 9, 1973 Netherlands ............ 7313891
[52] U.S. Cl. ............ 60/614; 60/324; 60/598; 123/119 C
[51] Int. Cl.² ............ F02G 3/00
[58] Field of Search ............ 60/280, 324, 597, 598, 60/599, 602, 614, 494; 123/119 C, 119 CE, 624; 138/44

[56] References Cited
UNITED STATES PATENTS

| 1,279,128 | 9/1918 | Lake | 60/624 |
| 2,232,483 | 2/1941 | Shiplette | 60/624 |
| 2,406,656 | 8/1946 | Birmann | 60/614 |
| 2,932,156 | 4/1960 | Eckert et al. | 60/624 |
| 2,933,287 | 4/1960 | Caddell | 60/280 |
| 3,217,487 | 11/1965 | Rothe | 60/602 |
| 3,221,491 | 12/1965 | Koenig et al. | 60/597 |
| 3,221,492 | 12/1965 | Carletti | 60/280 |

FOREIGN PATENTS OR APPLICATIONS

| 75,710 | 1947 | Czechoslovakia | 60/597 |
| 89,174 | 6/1953 | Denmark | 60/597 |

Primary Examiner—C. J. Husar
Assistant Examiner—David D. Reynolds
Attorney, Agent, or Firm—Snyder, Brown & Ramik

[57] ABSTRACT

The invention relates to an internal combustion engine having a turbine-compressor combination connected with the outlet duct for pressure filling by the thrust system; the invention has for its object to improve the shape of the high and steep peak of the exhaust pulse occurring particularly in engines having a high mean effective pressure so that the abrupt gas pulse is smoothed down so that the turbine is capable of operating with higher efficiency, and provides a combustion engine with pressure filling by the thrust system, the exhaust duct of which includes at least one restriction narrowing the passage area.

13 Claims, 4 Drawing Figures

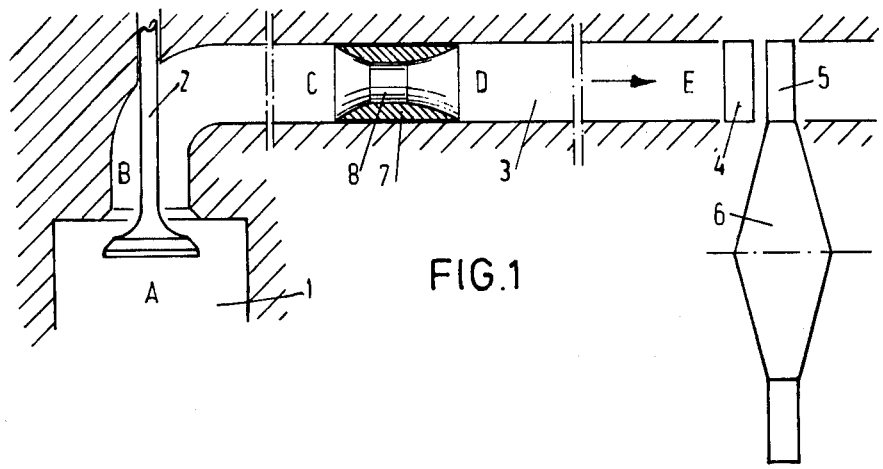
FIG.1
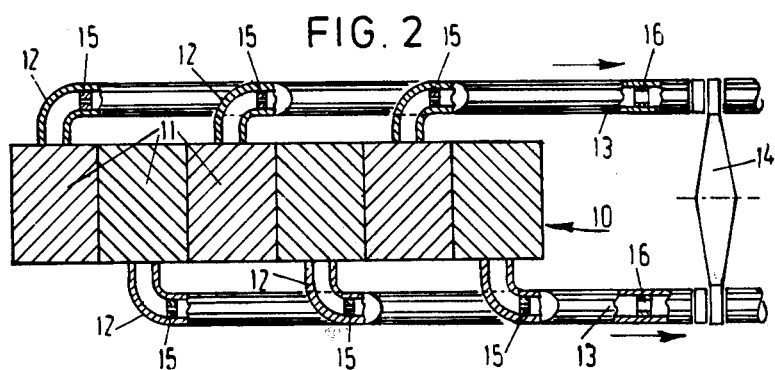
FIG.2
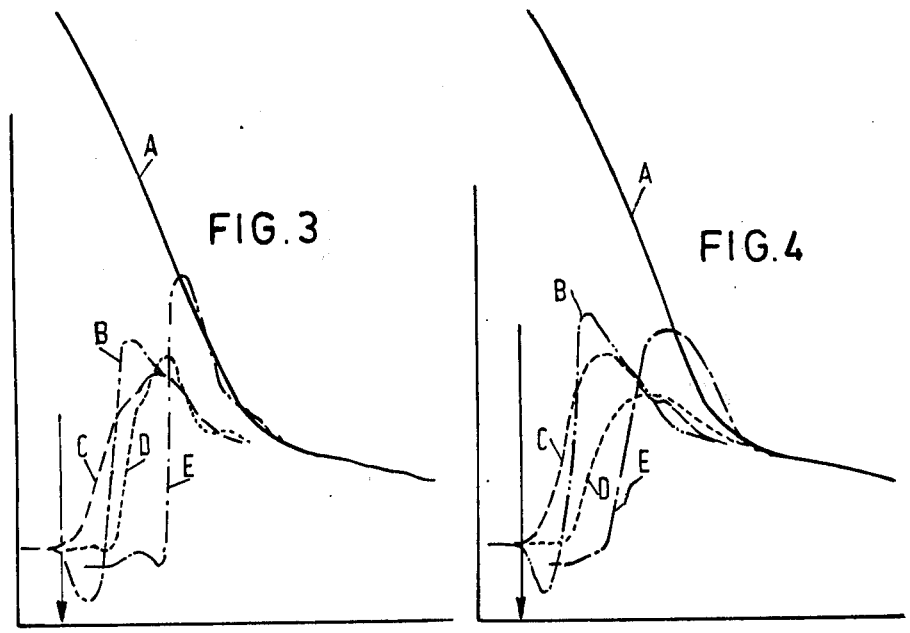
FIG.3
FIG.4

COMBUSTION ENGINE WITH PRESSURE FILLING BY THE THRUST SYSTEM

The invention relates to an internal combustion engine having a turbine-compressor combination connected with the outlet duct for pressure filling by the thrust system.

In the thrust-type pressure filling the turbine connected with the outlet duct is fed by a strongly pulsatory exhaust gas stream. Owing to the pressure ratio across the opening valve gap, the flow of the exhaust gas through this gap will be sonic and behind it it will be supersonic via an expansion fan. Since the channel form does not allow super-sonic mass transport, compression shocks are produced downstream, the speed decreasing and reconverting into pressure. By the follow-up mass stream the expansion fan is filled out (mass balance) so that the compression shocks shift upstream, the supersonic stream pattern being thus broken down and the outflow continuing subsonically. Therefore, in downstream direction a pressure pulse of high energy, which steeps up in the direction of propagation. The passage of the turbine across such a steep pressure front travelling substantially at sonic velocity gives rise to problems of blade enveloping streams both with the guide blades and the running blades so that loss of energy and a drop in efficiency of the turbine process are involved.

Since said phenomena increase with the mean effective pressure of the engine and with premature opening of the exhaust valve, they become increasingly troublesome in the application of the thrust system.

The invention has for its object to improve the shape of the high and steep peak of the exhaust pulse occurring particularly in engines having a high mean effective pressure so that the abrupt gas pulse is smoothed down so that the turbine is capable of operating with higher efficiency.

For this purpose the invention provides a combustion engine with pressure filling by the thrust system, in which the exhaust duct includes at least one restriction narrowing the passage area.

This restriction impedes the supersonic stream pattern so that the extreme value of the pressure pulse after the restriction is delayed in time and the strong pressure fluctuation of the gas pulse is drastically reduced.

The invention will now be described with reference to the drawing, in which

FIG. 1 shows schematically a combustion engine comprising a cylinder with an exhaust valve, an exhaust duct and a turbine connected herewith, FIG. 2 shows schematically a 6-cylinder combustion engine with the associated exhaust system, FIGS. 3 and 4 show graphs including curves of gas pulses at different areas in the exhaust system, that is to say an inlet and outlet system without and with restriction respectively in accordance with the invention.

Referring to FIG. 1 reference numeral 1 designates a cylinder of a combustion engine, in which only the exhaust valve 2 is shown. With the exhaust valve 2 is connected an exhaust duct 3 which opens out downstream near the guide blades 4 and running blades 5 of a turbine 6. The turbine 6 is part of the turbine-compressor combination, the compressor of which is not shown.

Between the exhaust valve 2 and the guide blade 4 of the turbine 6 the exhaust duct 3 there is provided in accordance with the invention a restriction 7 narrowing the passage area of the exhaust duct.

FIG. 2 shows a combustion engine 10 comprising six cylinders 11, whose exhausts 12 are connected with a common duct so that the exhaust periods of the cylinders connected with said duct overlap one another hardly or not at all in order to prevent the exhaust pulse of one cylinder from adversely affecting emptying or scavenging of a further cylinder. With pressure filling by the thrust system the normal maximum is three cylinders so that the 6-cylinder engine shown in FIG. 2 comprises two exhaust groups 13, which open out at a common turbine 14.

Owing to the comparatively long exhaust duct, more than one restriction is provided in accordance with the invention in the same exhaust system 13 because the physical mechanism of steeping up of the pressure front in the downstream sense continues to exist. As shown in FIG. 2, a restriction 15 is provided after each cylinder and the common duct 13 includes a restriction 16.

The restriction in accordance with the invention preferably has a flow opening of the venturi shape (see FIG. 1). The advantage of the venturi shape is that the increase in entropy is at a minimum so that the energy of the gas stream is maintained. According to the invention the slope angle from the throat of the venturi on the diffusor side of the venturi is smaller than 30°.

The passage of the restriction may vary in accordance with the invention between 0,25 and 0,90 of the nominal passage of the exhaust duct. It should be noted here that when a plurality of restrictions in each gas stream employed the result can be achieved with a reduced stream impedance, in which case the smallest passage has to be provided in the exhaust duct at a place lying as far as possible upstream, that is to say, as closely as possible after the exhaust valve and the largest passage at a place lying as far as possible downstream that is to say as closely as possible in front of the turbine in dependence upon the stream pattern (see restrictions 15 and 16 respectively).

The centre line of the passage of the restriction need not be central in the exhaust duct. In dependence upon the shape of the exhaust duct, for example, bends, said centre line is eccentric and preferably coincides with the line of gravity of the gas mass stream.

The graphs of FIGS. 3 and 4 show a comparison between the pulse pressures at different places in the exhaust duct in an exhaust system without and with restriction respectively in accordance with the invention. In each graph the ordinate has plotted on it the pressure and the time is plotted on the abscissa. The curve A represents the pressure in the cylinder (see also FIG. 1) and the curves B, C, D and E represent the pressure after the valve gap, in front of the restriction, after the restriction and finally in front of the turbine respectively. It is apparent from the graphs that the curve E shows a high pressure pulse just in front of the turbine in an exhaust system without restriction. This curve E is markedly flatted in FIG. 4, whilst in addition the front has a considerably less steep slope.

What is claimed is:

1. In combination with an internal combustion engine having at least one combustion chamber operating at high mean effective pressure and provided with an exhaust valve, a turbocharger having guide vanes and reaction vanes, and an exhaust pipe leading from said exhaust valve to said guide vanes, said exhaust pipe being of substantially uniform and predetermined cross sectional area whereby said vanes of the turbocharger normally would be subjected to pressure pulses of such high maximum pressure and short duration as inefficiently drives said turbocharger, the improvement which comprises:

restriction means disposed in said exhaust pipe for reducing said maximum pressure and significantly increasing said duration of said pressure pulses so as to increase the efficiency of driving said turbocharger.

2. In the combination defined in claim 1 wherein said restriction means locally decreases said predetermined cross sectional area to a value lying within the range of 25% to 90% of said predetermined cross sectional area.

3. In the combination as defined in claim 2 wherein said restriction means is of venturi form.

4. In the combination as defined in claim 3 wherein the venturi diverges from the throat thereof toward said turbocharger at an angle less than 30°.

5. In the combination as defined in claim 4 wherein the center line of said restriction means coincides with the line of gravity of the mass stream of exhaust gas flowing through said exhaust pipe.

6. In the combination as defined in claim 1 wherein said restriction means is of venturi form.

7. In the combination as defined in claim 6 wherein the venturi diverges from the throat thereof toward said turbocharger at an angle less than 30°.

8. In the combination as defined in claim 7 wherein the center line of said restriction means coincides with the line of gravity of the mass stream of exhaust gas flowing through said exhaust pipe.

9. In the combination as defined in claim 1 wherein the center line of said restriction means coincides with the line of gravity of the mass stream of exhaust gas flowing through said exhaust pipe.

10. In the combination as defined in claim 2 wherein the center line of said restriction means coincides with the line of gravity of the mass stream of exhaust gas flowing through said exhaust pipe.

11. In combination with an internal combustion engine having at least one combustion chamber operating at high mean effective pressure and provided with an exhaust valve, a turbocharger having guide vanes and reaction vanes, and an exhaust pipe leading from said exhaust valve to said guide vanes, said exhaust pipe being of substantially uniform and predetermined cross sectional area whereby said vanes of the turbocharger normally would be subjected to pressure pulses of such high maximum pressure and short duration as inefficiently drives said turbocharger, the improvement which comprises:

restriction means disposed in said exhaust pipe for reducing said maximum pressure and significantly increasing said duration of said pressure pulses so as to increase the efficiency of driving said turbocharger, said engine including a plurality of combustion chambers, said exhaust pipe comprising individual exhaust pipe branches extending from each combustion chamber merging into a common branch leading to said turbocharger, said restriction means comprising a first restrictor in each of said individual branches and a further restrictor in said common branch.

12. In the combination as defined in claim 11 wherein each first restrictor is of selected small cross sectional area and said further restrictor is of cross sectional area larger than said selected small cross sectional area.

13. In the combination as defined in claim 12 wherein said restriction means locally restricts said predetermined cross sectional area at a particular region between said exhaust valve and said guide vanes, the location of said particular region and the amount of local restriction being related to increase the efficiency of turbocharger drive and with said amount of local restriction lying within the range of 10–75% of said predetermined cross sectional area.

* * * * *